3,378,364
DEFOLIATION OF PLANTS
Morris L. Neuville, Marinette, Wis., and Robert B. Carroll, Greenwich, Conn., assignors to Ansul Chemical Company, Marinette, Wis., a corporation of Wisconsin
No Drawing. Continuation of application Ser. No. 322,053, Nov. 7, 1963, which is a continuation of application Ser. No. 39,429, June 29, 1960. This application Oct. 12, 1966, Ser. No. 586,303
10 Claims. (Cl. 71—70)

ABSTRACT OF THE DISCLOSURE

Methods of defoliating and harvesting living cotton and soybean plants, as well as improving the product quality and yield of same are provided which comprise applying to the leaves of said plants a sufficient, but non-injurious, amount with respect to the remainder of the plant of a composition containing an active defoliating agent having the following structural formula:

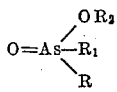

wherein R and $R_1$ are members selected from the group consisting of univalent hydrocarbon groups of the aliphatic series having 1 to 4 carbon atoms, and $R_2$ is a member selected from the group consisting of hydrogen, ammonium, alkali metals and alkaline earth metals and defoliating said plants.

---

This application is a continuation of application Ser. No. 322,053, filed Nov. 7, 1963, which was a continuation of application Ser. No. 39,429, filed June 29, 1960, both now abandoned.

This invention relates to an improved method for the defoliation of growing plants.

The defoliation of plants when they are nearing or at maturity has many advantages. Using cotton plants as an example, defoliation will expose the lower cotton bolls to sunlight for ripening purposes and thereby improve the quality and yield of the cotton crop. It will also enable more cotton to be harvested ahead of unfavorable late fall weather. The defoliated fields also provide better visibility for field hands and machine operators, enabling more efficient harvesting of the cotton. Picking also can start earlier in the day in defoliated fields, and the lower seed cotton moisture will mean less heat required at the gin; therefore, less damage to the fiber. In short, the defoliation of cotton is of particular widespread economic importance, and coupled with proper operation of mechanical pickers, will yield a better grade of cotton having less foreign matter and green stain.

An object of the present invention is to provide an improved treatment which will bring about the partial or complete removal of leaves of a living plant in an effective and economical manner. The utility and novelty of this invention will be apparent from the following specification.

According to the present invention it has now been found that certain derivatives of arsinic acid and their water-soluble salts are especially effective for defoliating living plants.

The arsinic acids of the present invention have the following structural formula:

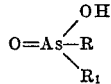

where R and $R_1$ are univalent hydrocarbon groups of the aliphatic series. The hydrocarbon groups corresponding to R and $R_1$ may be the same or different. Among the preferred aliphatic groups are methyl, ethyl, propyl, allyl and butyl. In the first member of the arsinic acid series, the univalent hydrocarbon radicals R and $R_1$ are both methyl groups, and this acid is therefore called dimethylarsinic acid, or more simply methylarsinic acid, and these terms are used synonomously in the following description. The common name for methylarsinic acid is cacodylic acid, and the series of arsinic acids are also referred to as the cacodylic acids. In the following description and claims, the term cacodylic acid or cacodylic acids when used refers to the series of dialkylarsinic acids, and the individual members of this group will be referred to by their chemical names.

Besides methylarsinic acid, other examples of the defoliating agents of the present invention include diethylarsinic acid, dipropylarsinic acid, methylethylarsinic acid, diallylarsinic acid and so forth, or mixtures thereof. The water-soluble alkali and alkaline earth metal salts, for example the sodium, potassium, calcium and magnesium salts, and also the ammonium salts of these acids have proved effective. These water-soluble salts may readily be produced by reaction of the cacodylic acids with alkali or alkaline earth metal bases or with ammonium hydroxide. The cacodylic acids, in addition to reacting with strong bases, also reacts with strong acids to form salt-like compounds, which are also suitable for use in carrying out the present invention. As an example may be mentioned the reaction product between dimethylarsinic acid and hydrochloric acid, i.e., $$(CH_3)_2AsO_2H \cdot HCl$$

The reaction products between cacodylic acids and strong acids other than hydrochloric acid, such as nitric acid, sulfuric acid and so forth, may also be used. Also suitable are the esters of the cacodylic acids which hydrolyze readily in the presence of moisture. Among these may be mentioned the methyl, ethyl, propyl, and butyl esters, and so forth, of the cacodylic acids. Compounds, such as arsenicals, which are easily oxidized, for example by air or other oxidizing agents, to yield cacodylic acids, may also be used. These latter compounds are described by Goodwin and Lyons, J. Am. Chem. Soc., 81, 311–314 (1959).

Among the compounds mentioned, dimethylarsinic acid and its water-soluble salts give particularly good results and are preferred. Among the water-soluble salts of dimethylarsinic acid, those produced by reaction with alkali or alkaline earth metal bases and ammonium hydroxide are preferred.

Other arsenic compounds have been used for treatment of plants, but in general they presented toxicity problems which do not arise when the defoliating agents of the present invention are employed. Toxicity results, of course, may vary over a relatively broad range depending on the methods of reporting data, manner of administering the test compound, animals used in the test, and so forth. Still even taking these factors into account, it may be said that arsenic acid, $H_3AsO_4$, for example, is 50 to 100 times more toxic to mammals than is methylarsinic, for example. Although the reason for the great difference in toxicity is not well understood, the arsenic-carbon bond present in the cacodylic acids disclosed herein is thought to be a controlling influence in this phenomenon.

The defoliating agents of the present invention may be employed alone or in combination with other defoliating agents. The defoliant may be applied in a liquid carrier, for example, in an aqueous medium, or suspended in a hydrocarbon oil medium, and it can also be used as a dust. Preferably, the defoliant is dissolved in an aqueous medium and applied as a spray.

When a defoliant is applied in an aqueous carrier, it may be desirable to add to the composition a surface active agent in order to promote contact of the solution with the leaves of the plant. Any of the well-known surface-active agents can be employed. For example, alkali metal salts of long chain alkyl sulfates, alkali metal salts of alkyl aryl sulfonic acids, such as petroleum sulfonic acids and dodecylbenzene sulfonic acid, polyethylene glycol ethers of alkyl phenols, and the like are suitable. Wetting agents that have given particularly good results are: Tergitol NPX (nonyl phenyl ether of polyethylene glycol manufactured by Union Carbide Company); Igepal CO–630 (a polyoxyethylated nonyl phenol containing 9–10 —[$CH_2CH_2O$]— groups made by General Aniline & Film Corporation); and Triton X–155 (an alkyl aryl polyether alcohol made by Rohm & Haas Corporation). A fish protein, rosin or some other material which is slowly water-soluble may also be added to hold the active ingredient on the leaf surface.

In applying the defoliating material as a dust it may be incorporated in one or more of such finely divided inert substances as talc, pyrophyllite, various clays, fuller's earth, diatomaceous earth, and like water-insoluble conditioning materials. In a proper state of subdivision alone or incorporated in a dusting powder these compositions may be dusted on the foliage with the usual dust applicators.

The defoliant of the present invention may also be applied as a suspension in a non-aqueous medium, for example a hydrocarbon oil medium. The oil carriers may be any of the ordinary horticultural spray oils. These oils will usually be mineral oils, but oils of animal or vegetable orgin or synthetic oils may also be used. In general, the oils should be of relatively bland, non-phytotoxic nature since any composition which would kill the plant outright could not promote the development of the abscission layers which is necessary to successful defoliation. In order to avoid objectionable staining of plant fibers, oils that are colorless, or have only a fairly light color are preferred. Particularly useful are the relatively highly paraffinic oils (unsulfonated residue greater than about 80 to 85 percent), such as mineral seal oil, kerosene, refined gas oils and very light lubricating oils, and the like. Various blends of such oils may also be used, to which may be added varying amounts of lesser refined oils such as catalytically cracked gas oil fractions, light diesel oils, and so forth.

The oil may be such that the defoliant is soluble or insoluble therein. Where the defoliant is insoluble in the oil, a suitable cosolvent such as methanol, ethanol, isopropyl alcohol, other like polar liquids, and chloroform can be added to provide solubility of the defoliant in the oil carrier. Alternatively, suitable wetting or dispersing agents, such as those mentioned hereinabove may be used. As examples of reaction type solvents in which the cacodylic acids are soluble may be mentioned acetic acid and ethanolamine.

The defoliant can also be applied in water-in-oil emulsions. An emulsifying agent is generally added to promote emulsification. The type of emulsifiers is not critical. Cationic, anionic, or non-ionic emulsifiers can be employed. Suitable emulsifiers include fatty acid amides, quaternary ammonium compounds, alkali metal salts of oil-soluble alkyl aryl sulfonic acids, such as petroleum sulfonic acids, alkali metal salts of long chain alkyl sulfates, fatty acid esters of polyhydric alcohols, such as sorbitol, mannitol and the like, polyalkylene glycol ethers or alkyl phenols, and many well-known emulsifiers.

The various ingredients in the carrier should, of course, be non-reactive with the defoliants disclosed herein.

The amounts of the defoliating agents which it will be necessary to use will depend upon the type of plants being treated, the degree of maturity of the plants, and, to a lesser degree, the particular carrier employed. The amount of the defoliating agent applied is a function of the concentration of the defoliating agent in the composition being used, and also of the total amount of the composition applied.

The amount of the defoliating agent applied should be high enough to insure proper defoliation, and yet low enough to avoid the danger of killing the leaf before the abscission layers have had an opportunity to form. If the leaf is killed suddenly, so that the abscission layers do not have an adequate opportunity to form, defoliation will not occur.

In general, the concentration of the defoliating agent in the carrier on a weight basis may vary from about 0.01 to about 10 percent or higher, is preferably between about 0.05 and about 2 percent, and is usually between about 0.1 and 1 percent. The proper amount of the defoliant on the plants being treated may be achieved either by a single application of a relatively concentrated composition, or by a plurality of applications of a relatively dilute composition. One application of a mixture falling within the described concentration ranges, however, has usually been found to be sufficient. The concentration may be readily determined for each plant undergoing defoliation.

Where a maximum degree of leaf drop is desired, compositions having the proper concentrations may be applied so as to supply at least about 0.5 or between about 0.5 and 20 pounds of the defoliant or more per acre of crop, preferably between about 1 and about 10 pounds per acre. Thus, when an aqueous solution having the concentration of defoliating agent described hereinabove is used, for example, about 3 to about 50 gallons per acre, and preferably between about 10 to 30 gallons per acre, have been found to give optimum results.

The invention is illustrated by the following examples which should not be considered as limiting the invention or the claims thereto in any manner. In the examples, the defoliation of cotton and soybean plants is exemplary of the present invention and illustrates the manner in which the invention may be applied to other crops which provide valuable fruit, seeds, and so forth.

The following examples were conducted with immature greenhouse plants and illustrate the effectiveness of the defoliants disclosed herein.

Example I

Aqueous solutions having a pH ranging from about 4.0 to about 9.5 and containing 0.1 percent by weight dimethylarsinic acid were prepared. The solutions having a pH of 9.2 were made up by dissolving enough sodium tetraborate in the water to give the desired pH and then adding 0.1 percent by weight dimethylarsinic acid. The solutions with lower pH's were prepared by adding 0.1 percent by weight dimethylarsinic acid to buffered solution prepared from McIlvaine's buffer mixtures. McIlvaine's formula comprises a disodium phosphate-citric acid system and is reported in Lange's Handbook of Chemistry, Fifth edition, 1944, p. 1118. Compositions were made using both purified dimethylarsinic acid (95.13%) and dimethylarsinic acid sold as a commercial preparation under the trademark Ansar. The commercial preparation contained 75 to 85 percent by weight of dimethylarsinic acid, the remainder being largely sodium chloride.

The formulae contained, in addition to the buffer, 0.04 percent by weight of the wetting agent Tergitol NPX (nonyl phenyl ether of polyethylene glycol manufactured by Union Carbide Chemicals Company).

The resulting solutions, at two pH levels, were sprayed on soybeans (Black Wilson). The soybeans were at the 1 to 2 trifoliate leaf stage, were 15″ to 18″ high, and spraying was continued until re-drop occurred, i.e., until drops or droplets of the spray formed on the leaves and started to run off. The quantity of spray varied for each plant, depending on the size of the plant, number of leaves, and so forth. In general, about 60–75 cc. of spray was applied to each plant. The counts reported in Table I were taken two weeks after treatment.

TABLE I.—EFFECT OF DIMETHYLARSINIC ACID ON GREENHOUSE SOYBEANS

| Treatment | Concentration of Dimethylarsinic Acid | Wetting Agent | pH | Soybean |
|---|---|---|---|---|
| None | 0 | Tergitol | 4 | 3–5 trifoliate. |
| Do | 0 | ___do___ | 7 | Do. |
| Ansar | [1] 0.1 | ___do___ | 4 | 1–2 trifoliate. |
| Do | [1] 0.1 | ___do___ | 1 | Do. |
| Purified Cacodylic Acid (95.13%). | 0.1 | ___do___ | 4 | Do. |
| Do | 0.1 | ___do___ | 7 | Do. |

[1] Weight percent based on total dimethylarsinic acid.

Example II

Solutions were prepared by dissolving dimethylarsinic acid and sodium hydroxide in water to give solutions of the sodium salt of dimethylarsinic acid. Enough sodium hydroxide was used to give the solution an alkaline pH. Using the procedure of Example I, these solutions were sprayed onto immature cotton plants, variety Coker-100, about 15 inches tall, having 5 to 7 leaves, and grown under greenhouse conditions. The results reported in Table II were observed two weeks after spraying. The control which contained no methylarsinic acid, was made up by dissolving sodium hydroxide in water to give a solution having the same pH as the active solution.

TABLE II.—EFFECT OF SODIUM SALT OF DIMETHYLARSINIC ACID ON GREENHOUSE COTTON

| Concentration of Dimethylarsinic Acid | pH | Defoliation |
|---|---|---|
| 0.00 | 9.15 | Neg. |
| [1] 0.01 | 9.15 | Spot |
| [1] 0.05 | 9.15 | Def. |

[1] Weight percent dimethylarsinic acid added to solution.
Neg.—No visible effect.
Spot—Foliage burned.
Def.—50K defoliation.

Example III

Example I is repeated with the exception that no wetting agent is employed. Results similar to those reported in Table I are obtained.

Example IV

Example I is repeated with the exception that Triton X-155 and Igepal CO-630 are substituted for Tergitol. Results similar to those reported in Table I are obtained.

The following example shows the effectiveness of the defoliating agents on full-grown or mature plants.

Example V

Solutions similar to those of Example I were prepared and applied to mature cotton (in bloom). Results based on observations made 30 days after application are reported in Table II. As in Example III, the substitution of Igepal CO-630 and Triton X-155 for the Tergitol NPX wetting agent produced no variations in results.

TABLE III.—EFFECT OF ANSAR (75.2%) AND PURIFIED DIMETHYLARSINIC ACID (95.13%) ON MATURE COTTON (IN BLOOM) WHEN APPLIED IN A WETTING AGENT AT TWO pH LEVELS

| Treatment | Level | Wetting Agent | pH | Leaf Count |
|---|---|---|---|---|
| None | 0 | Tergitol | 4 | 8–10. |
| Do | 0 | ___do___ | 7 | 8–10. |
| Ansar | [1] 0.1 | ___do___ | 4 | 1–2 slight secondary regrowth. |
| Do | [1] 0.1 | ___do___ | 7 | Do. |
| Pure Cacodylic | [1] 0.1 | ___do___ | 4 | 1–2, regrowth at each leaf node. |
| Do | [1] 0.1 | ___do___ | 7 | Do. |

[1] Weight percent dimethyarsinic acid.

The following examples illustrate the performance of the defoliants disclosed herein in actual field tests.

Example VI

Dimethylarsinic acid was applied as a 1 percent by weight aqueous solution, with no wetting agent, at a rate of 18 gallons of water solution per acre (1½ lbs. of dimethylarsinic acid per acre) to cotton which was a cross between Delta Pine Land–14 and Stoneville–2B, a special type which was being bred for wilt resistance. The cotton was between three and five feet tall, fully matured, bolls beginning to open or opened. Because of extraordinary rainfall during the preceding two months the cotton was well leafed with some blooms still being formed on the younger growth. A second pass with this solution was also made over one test plot, the total dimethylarsinic acid applied to this area being 3 lbs. per acre.

After five days, defoliation was reported as "complete," there being no noticeable difference between the 1½ lb. and 3 lb. per acre applications.

This example illustrates the extremely rapid defoliant action of the agents disclosed herein, which is of considerable importance, since it allows greater time for harvesting the cotton following defoliation. Slower acting defoliants of the prior art also are adversely affected by low night time temperatures frequently encountered in late season defoliant application and also must be reapplied if application is followed shortly by rain. The defoliants disclosed herein are less affected by these disadvantages and their activity is not impaired, for example, by rain falling more than 2 hours after application.

The lack of distinction between the 1½ and 3 lbs. per acre rate of application is also an advantage. Many defoliants, if applied at double the rate recommended, will frequently kill the leaf before the abscission layer has an opportunity to form and when this happens, defoliation will not occur. As is clear from the foregoing example, considerable variation in the applied amounts of the defoliating agents disclosed herein is possible without serious adverse consequences.

Example VII

Dimethylarsinic acid was applied as a 1 percent by weight water solution to Pelican variety soybeans at a rate of 7.2 pounds to 7.5 pounds of methylarsinic acid per acre. The plants were about a week to two weeks before maturation, and were in a good vegetative condition. In about 5 days, there was good defoliation and desiccation.

This example again illustrates the rapid action of the defoliating agents described herein. In soybean production, this is of value as it allows the beans to be more mature before defoliation, which results in a material increase in the quality of the crop due to a lower moisture content in the bean when harvested. This is of importance where a variety has low shatter, i.e., it does not open its pods on late ripening and lose the seed to the ground, and is fairly early to ripen. Thus, a week or ten days in advance of natural harvest these beans can be defoliated and enter the market at a good competitive price.

Example VIII

Example I is repeated, with the exception that diethylarsinic acid is used as the defoliating agent. Results similar to those of Example I are obtained.

Example IX

Example III is repeated, with the exception that methylethylarsinic acid is used as the defoliating agent. Results similar to those of Example I are obtained.

Although the solutions prepared in the above examples have controlled pH's, this is for experimental purposes only. It should be understood that compositions having pH's other than those indicated are also suitable, although under actual field conditions the compositions will ordinarily have a pH of between about 4 and 9.

The invention in its broader aspects is not limited to the specific details shown and described but departures may be made therefrom within the scope of the accompanying claims without departing from the principles of the invention and without sacrificing its chief advantages.

What is claimed is:

1. The method of defoliating living cotton and soybean plants which comprises applying to the leaves of said plants a sufficient but non-injurious amount with respect to the remainder of the plant of a composition containing an active defoliating agent having the following structural formula:

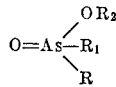

wherein R and $R_1$ are members selected from the group consisting of univalent hydrocarbon groups of the aliphatic series having 1 to 4 carbon atoms, and $R_2$ is a member selected from the group consisting of hydrogen, ammonium, alkali metals and alkaline earth metals, and defoliating said plants.

2. The method of claim 1 which comprises defoliating living cotton plants which comprises applying to the leaves of said plants a sufficient but non-injurious amount with respect to the remainder of the plant of a composition containing about 0.1% to about 1.0% by weight of an active defoliant selected from the group consisting of an alkali metal salt of dimethyl arsinic acid, dimethyl arsinic acid and mixtures thereof in an aqueous solution.

3. The method of claim 1 which comprises defoliating living soybean plants which comprises applying to the leaves of said plants a sufficient but non-injurious amount with respect to the remainder of the plant of a composition containing about 0.1% to about 1.0% by weight of an active defoliant selected from the group consisting of an alkali metal salt of dimethyl arsinic acid, dimethyl arsinic acid and mixtures thereof in an aqueous solution.

4. The method of improving the product quality and yield of cotton and soybean plants which comprises applying to the leaves of said plants a sufficient, but non-injurious amount with respect to the remainder of the plant, of a composition containing as an active defoliant a member selected from the group consisting of an alkali metal salt of dimethyl arsinic acid, dimethyl arsinic acid and mixtures thereof to form the abscission layer in the leaves and to effectively defoliate the plant.

5. The method of harvesting cotton and soybean plants and improving the product quality and yield of plants which comprises applying to the leaves of said plants a sufficient, but non-injurious amount with respect to the remainder of the plant, of a composition containing as an active defoliant a member selected from the group consisting of an alkali metal salt of dimethyl arsinic acid, dimethyl arsinic acid and mixtures thereof to form the abscission layer in the leaves, to effectively defoliate the plant, and harvest the product of the plant.

6. The method of claim 5 wherein the composition containing an active defoliant is applied to the leaves of living cotton plants.

7. The method of claim 5 wherein the composition containing an active defoliant is applied to the leaves of living soybean plants.

8. The method of harvesting cotton and soybean plant products which comprises applying to the leaves of said plants at a time sufficiently prior to the normal harvest time of said plants to allow for effective defoliation of said plants, a sufficient, but non-injurious amount with respect to the remainder of the plant, of a composition containing as an active defoliant a member selected from the group consisting of an alkali metal salt of dimethyl arsinic acid, dimethyl arsinic acid and mixtures thereof to form the abscission layer in the leaves, to effectively defoliate the plant, and harvesting the product produced by the plant.

9. The method of claim 8 wherein the composition containing an active defoliant is applied to the leaves of living cotton plants.

10. The method of claim 8 wherein the composition containing an active defoliant is applied to the leaves of living soybean plants.

References Cited

Swingle: Journal of Agricultural Research, vol. 24, pp. 501 to 538 (pp. 517 and 518 relied upon).

JAMES O. THOMAS, Jr., *Primary Examiner.*

UNITED STATES PATENT OFFICE
CERTIFICATE OF CORRECTION

Patent No. 3,378,364                      April 16, 1968

Morris L. Neuville et al.

It is certified that error appears in the above identified patent and that said Letters Patent are hereby corrected as shown below:

Column 5, line 40, "50K" should read -- 50% --. Column 6, line 44, "variety soybeans" should read -- Variety Soybeans --.

Signed and sealed this 21st day of October 1969.

(SEAL)
Attest:

Edward M. Fletcher, Jr.                      WILLIAM E. SCHUYLER, JR.
Attesting Officer                            Commissioner of Patents